July 7, 1970

J. D. RAMSAY 3,519,093

APPARATUS AND METHOD FOR SENSING MASS, AND
HIGH-SPEED WEIGHING APPARATUS AND
METHOD UTILIZING SAME

Filed Dec. 5, 1967

INVENTOR:
JOSEPH D. RAMSAY
BY
Howson & Howson
ATTYS.

July 7, 1970

J. D. RAMSAY 3,519,093

APPARATUS AND METHOD FOR SENSING MASS, AND
HIGH-SPEED WEIGHING APPARATUS AND
METHOD UTILIZING SAME

Filed Dec. 5, 1967

INVENTOR:
JOSEPH D. RAMSAY
BY Howson &
Howson
ATTYS.

July 7, 1970  J. D. RAMSAY  3,519,093
APPARATUS AND METHOD FOR SENSING MASS, AND
HIGH-SPEED WEIGHING APPARATUS AND
METHOD UTILIZING SAME
Filed Dec. 5, 1967  3 Sheets-Sheet 3
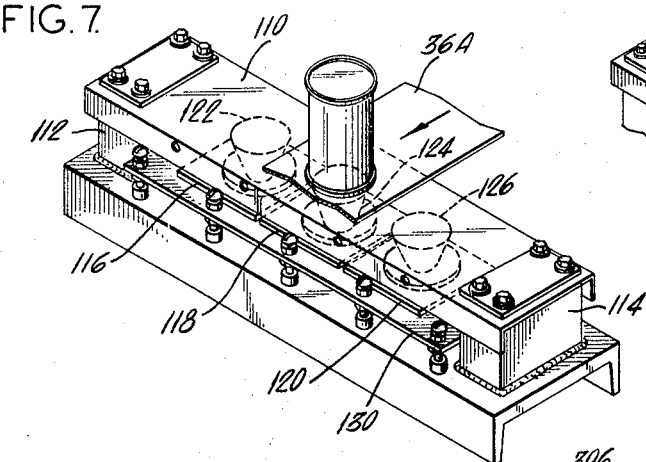
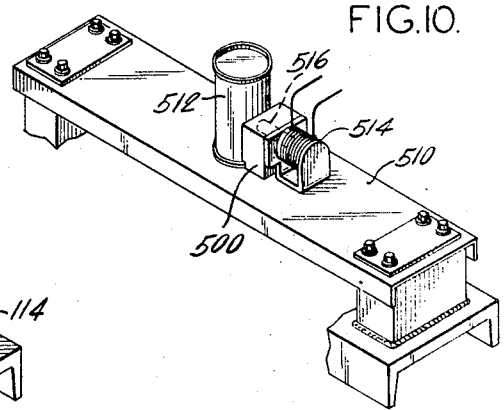
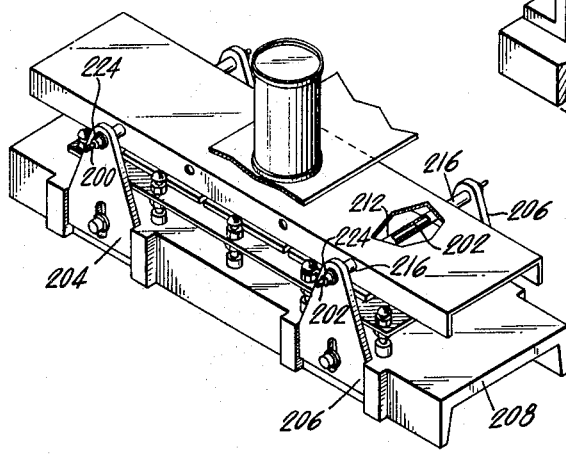
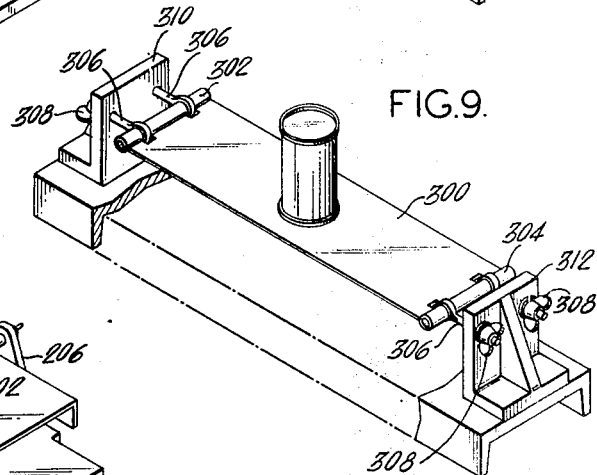
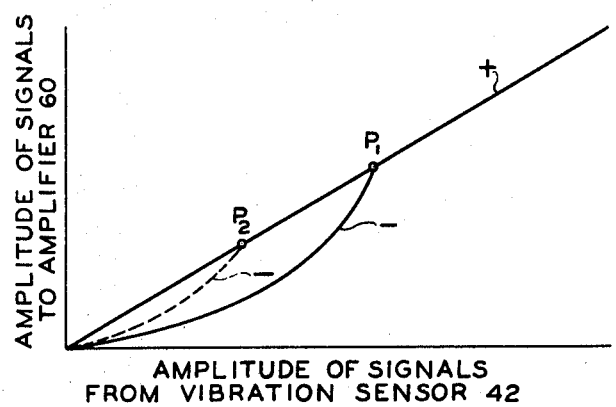
INVENTOR:
JOSEPH D. RAMSAY
BY Howson & Howson
ATTYS.

United States Patent Office 3,519,093
Patented July 7, 1970

3,519,093
APPARATUS AND METHOD FOR SENSING MASS, AND HIGH-SPEED WEIGHING APPARATUS AND METHOD UTILIZING SAME
Joseph D. Ramsay, Audubon, N.J., assignor to Campbell Soup Company, Camden, N.J., a corporation of New Jersey
Filed Dec. 5, 1967, Ser. No. 688,173
Int. Cl. G01g 3/14
U.S. Cl. 177—1        11 Claims

ABSTRACT OF THE DISCLOSURE

Product-containing cans are weighed separately and sequentially by positioning them in sequence on a resilient horizontal support which is vibrated rapidly in flexure at the resonant frequency of the support with the can on it. Vibration of the support is provided by an electromechanical driver, an electromechanical pickup, and a feedback amplifier system. The electrical oscillations in the feedback system provide signals having frequencies representative of the mass of the can on the support, which signals may be used to sort out misfilled cans, control filling of cans, or for other purposes.

BACKGROUND OF THE INVENTION

This invention relates to apparatus and methods for sensing the masses of objects, and particularly to apparatus and methods for the rapid weighing of product-containing cans.

Various types of weighing machines are known in which weighing is accomplished by detecting the stretching, compressing or deflection of a spring due to the weight of the object to be weighed, or by observing a balancing of the object against a reference weight. Such machines generally tend to produce oscillatory motions which limit the speed at which successive weighings can be accurately made. While it is possible to damp such oscillations by frictional means, a substantial time is still required to complete one accurate weighing and become ready for a subsequent accurate weighing. Although by careful design the time required for each complete weighing operation can be reduced to a relatively small value, this time nevertheless constitutes a limit on the rate at which successive weighings can be made. Also known are the effects of different weights on the resonant frequency of stretched strings differently-tensioned by the different weights; however, so far as is known no system using the latter phenomenon has been adaptable to the rapid weighing of successive objects.

One application for high-speed weighing is in the weighing of successive product-filled containers, such as cans of food, as they pass a weighing station in a rapidly-moving train, to determine whether the cans are adequately filled. One of many other possible applications is in monitoring the increasing weight of a container and contents as the container is being filled, so that filling may be terminated when the weight of the container and contents reaches a predetermined value. In either of these applications a sensing of the mass of the container plus its contents will provide an indication of the amount of product in the can, and of the level of the product in the can, provided the can is of known size and weight.

It is therefore an object of the invention to provide a new and useful method and apparatus for sensing the masses of objects.

Another object is to provide such an apparatus and method for producing rapid sensing of the mass of an object.

Another object is to provide a method and apparatus which provide rapid measurement of the mass of a moving object.

A further object is to provide a new and useful method and apparatus which permits successive measurements of the masses of objects at a station which the objects pass in a rapidly-moving train.

It is another object to provide a new and useful method and apparatus for producing signals representative of the masses of objects and for operating control apparatus in response thereto.

Still another object is to provide a new and useful method and apparatus for the high-speed weighing of successive product-filled cans.

It is another object to provide a new and useful method and apparatus for weighing a product-containing can while it is being filled, and for discontinuing filling thereof when the can and contents attain a predetermined weight.

SUMMARY OF THE INVENTION

In accordance with the invention, the foregoing objects are achieved by the provision of a method for sensing the mass of an object in which the object is vibrated as part of a flexurally-vibrating mechanically-resonant system and the resonant frequency of the system detected to provide indications of the mass of the object.

In a preferred form of the invention, the object is supported on an elongated member which is vibrated flexurally at the resonant frequency of the support member with the object supported thereon. The vibrating support member is preferably a horizontally-extending member, for example a horizontal beam supported at one or more points. The support member is preferably vibrated by electromechanical driving means supplied with electrical oscillations recurrent at said resonant frequency. These electrical oscillations are preferably produced by a feedback-type of system comprising vibration-sensing means which produce feedback signals indicative of the frequency of vibration of the support together with amplifier means which amplify the feedback signals and use them to vibrate the support member. Since the resonant frequency of the support with the object on it depends upon the mass of the object, detection of the frequency or period of the electrical oscillations provides signals representative of the mass of the object. When the object is a standard container and its contents, the latter signals may be used, for example, as indications of the extent of filling of the container and/or used for control purposes such as control of filling of the container or diverting of misfilled cans.

Preferably the amplitude and period of the vibrations are such that the measurement of mass can be accomplished in a very short time, e.g. in a small fraction of a second, but without producing mechanical instability of the object on the support. Preferably, also the feedback system includes stabilized amplifier means comprising a positive feedback path having high gain at low signal levels and a lower gain at higher signal levels so as to ensure that the vibration amplitude will be limited to a predetermined value.

As further preferred features, the objects to be weighed may be carried in a train on a flexible belt passing over and adjacent the vibrating member so that each object is supported in turn on the vibrating member; position-sensing means are preferably employed to detect times at which the objects are properly positioned on the vibrating member and to control the frequency-detecting means so that it produces output indications only at such times.

Other objects and features of the invention will be more readily understood from a consideration of the following detailed description, taken in connection with the accompanying drawings in which:

FIG. 7 is a perspective view of the embodiment of FIG. 5;

FIG. 8 is a perspective view illustrating a modification of the invention;

FIG. 9 is a perspective view of another embodiment of the invention;

FIG. 10 is a perspective view of another embodiment of the invention; and

FIG. 11 is a graphical representation to which reference will be made in explaining certain electrical operations in a preferred embodiment of the invention.

DESCRIPTION OF SPECIFIC EMBODIMENTS

Figure 2:
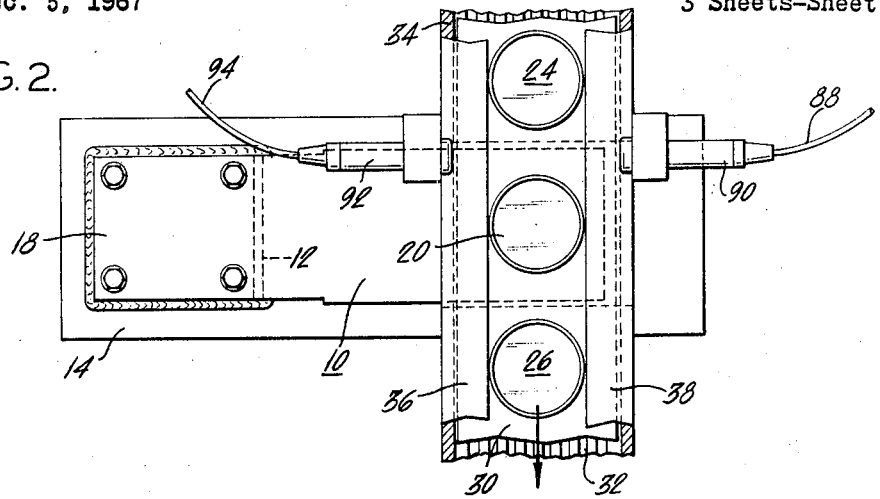
FIG. 2 is a plan view of a portion of the apparatus of FIG. 1.
Figure 1:
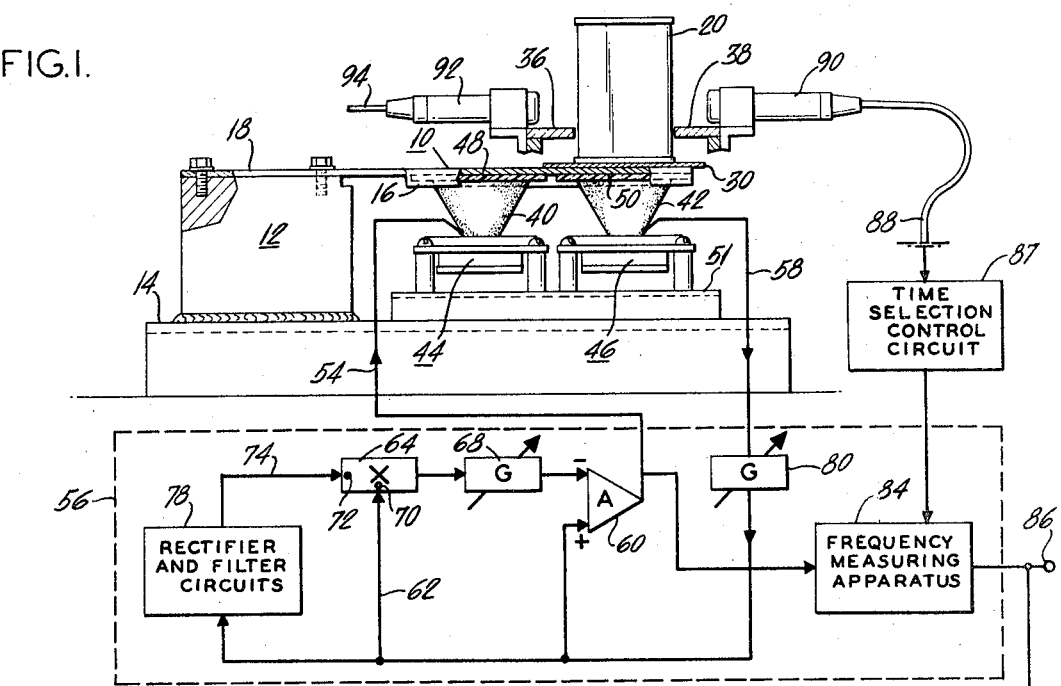
FIG. 1 is a side elevational view, partly in section, showing one embodiment of the invention, and in which the electrical portion of the system is shown in schematic block form.
Figure 3:
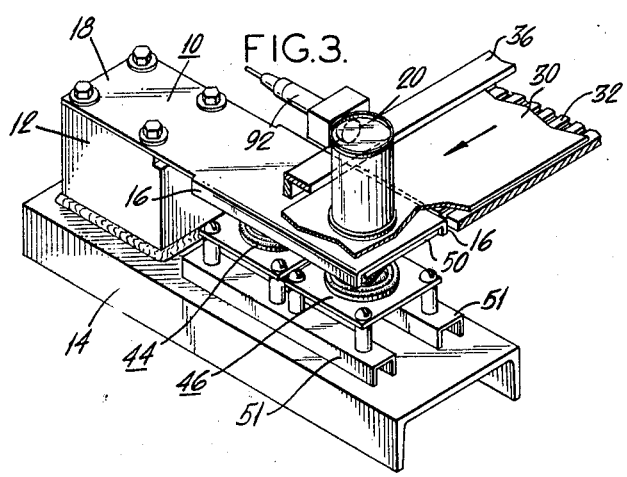
FIG. 3 is a perspective view of a portion of the apparatus of FIG. 1.

In the embodiment of the invention shown in FIGS. 1, 2 and 3, the vibratory support member is a cantilever beam 10 of spring steel in the form of a generally-rectangular strip, one flat end of which is screwed tightly to the top of a support block 12, which in turn is mounted on a massive metal base 14. To provide greater stiffness for the beam, the lateral edges of the steel strip are bent downwardly as at 16 to provide a U-shaped cross section, except for the flat portion 18 of the strip which is on top of and extending from the beam support block.

The object whose mass is to be determined, which can be a can 20 containing a food product, is supported on the beam near its free end. Can 20 is one of a train of cans, others of which are designated 24 and 26, each can of the train being carried on an endless, flexible, motor-driven plastic belt 30 of light weight. Belt 30 slides along the top of, and is supported on each side of the beam 10 by, ridged undersupports 32 and 34, the top surfaces of which are substantially the same level as, or slightly above, the top of the beam. The belt 30 passes over the adjacent the top of the beam, so that each can is supported in turn by the beam in passing over it. A pair of guide rails 36 and 38 position the cans laterally of the belt so that they traverse the same part of the beam.

Two lightweight flexible truncated cones 40 and 42, which in this example are the usual air-moving cones of a pair of permanent-magnet loudspeakers 44 and 46, respectively, are secured at their upper ends, as by cementing, to plastic plates 48 and 50, also respectively; these plates in turn are secured, as by cementing, to different longitudinally-spaced portions of the underside of beam 10. Speakers 44 and 46 are mounted on a sub-base 51 supported on base 14, and each includes the usual voice coil capable of vibrating its corresponding cone in synchronism with variations in current through the voice coil. Cone 40 constitutes the driver cone for vibrating the beam 10 in flexure along the vertical direction, and cone 42 constitutes the sensor cone used in sensing the frequency of vibration of the beam.

The driver cone 40 is operated, in the manner usual in loudspeakers, by electrical signals applied to the voice coil thereof over line 54 from resonator and frequency-sensing circuits 56; cone 42 operates in a manner somewhat similar to a dynamic microphone, in that vibrations thereof due to beam vibrations induce electrical oscillations of the same frequency in the voice coil of loudspeaker 46 which are delivered via line 58 to resonator and frequency-sensing circuits 56.

The signals on line 58, comprising oscillations at the vibration frequency of the beam 10, are supplied to the "positive" input terminal of differential power amplifier 60, which may be of conventional form. The output of amplifier 60, which is supplied to line 54, is proportional to the difference between the signals applied to its "positive" and "negative" input terminals (designated + and —, respectively, in the drawing). The polarity of the signals from amplifier 60 is such that positive feedback is thereby provided to the voice coil of speaker 44.

The "minus" input terminal of amplifier 60 is supplied with oscillations from line 58 via line 62, signal multiplier 64, and a suitable gain-adjusting device 68, this circuit comprising a stabilizing negative-feedback circuit. Gain-adjuster 68 may be a variably-tapped voltage divider or any other suitable conventional device. Multiplier 64, which may be conventional in form, amplifies the signal supplied to one input terminal 70 thereof from line 62 by a factor which varies substantially in proportion to the direct-voltage applied to its other input terminal 72 over line 74. The direct control voltage is produced at line 74 in response to the feedback signal from line 58 by a rectifier and filter circuit 78. A conventional gain-adjusting device 80 may also be connected in series with the feedback line 58.

The beam 10 with can 20 thereon comprises a mechanically-resonant system, the resonant frequency of which decreases with increases in the mass of can 20 and its contents. While the frequencies corresponding to various masses on beam 10 may be calculated to a close approximation, it is generally convenient to calibrate the apparatus by adding various masses to the beam, observing the resultant frequencies, and plotting a graph of resonant frequency versus added mass. When it is desired merely to determine whether the can and contents have a mass in excess of, or less than, a predetermined mass, the apparatus need be calibrated for only that single predetermined mass.

In the operation of the portion of the system thus far described the apparatus is connected as shown in FIG. 1, the beam 10 and any mass thereon serving as a frequency-determining mechanically-resonant system. That is, any oscillations from amplifier 60 applied to the voice coil of speaker 44 which are at the resonant frequency of beam 10 with can 20 thereon produce substantial vibrations of beam 10 at said resonant frequency; these vibrations induce electrical oscillations of the same frequency in the voice coil of speaker 46, which oscillations are supplied as positive feedback to the "positive" input terminal of amplifier 60 and thence over lead 54 back to speaker 44 to maintain the resonant vibration of the beam. The electrical oscillations at the resonant frequency are also supplied by way of multiplier 64 and gain-adjusting means 68 to the "negative" input terminal of amplifier 40 as negative feedback so as to limit the amplitude of the output oscillations from amplifier 60.

The gain-adjusting means 68 and 80 are preferably adjusted so that when the mechanical vibrations and the electrical oscillations first begin to build up, the amplitude of the oscillations supplied to the "negative" input terminal of amplifier 60 is relatively small and insufficient to reduce substantially the effects of the oscillations supplied to the "positive" input terminal thereof, so that the oscillations build up rapidly. However, rectifier and filter circuit 78 produces a direct control voltage at lead 74 which is proportional to the amplitude of the oscillations supplied thereto and which causes the gain of multiplier 64 to vary substantially in proportion to the amplitude of the feedback signal on line 58. The amplitude of the negative feedback signal supplied to amplifier 60 is proportional to the amplitude A of the signal on line 58 multiplied by the gain of multiplier 64, which is also proportional to A because of the action of the control signal at terminal 74; the negative feedback signal to amplifier 60 therefore has an amplitude proportional to the square of the instantaneous maximum value of the positive feedback signal. Accordingly, as oscillations build up in the circuit, the negative feedback voltage increases more rapidly than linearly and ultimately provides the "negative" input terminal of amplifier 60 with a signal sufficient to cancel the effects of further increases in the positive feedback signal. The amplitude of the oscillations, and of the mechanical vibrations, is therefore limited at a definite amplitude level controllable by adjustment of the gain-controlling means 68. Preferably the gain-control setting is such as to limit the amplitude of the vibrations to a level for which the can does not separate vertically from the beam at any point in its vibration.

It will be appreciated that the maximum acceleration of the vibrating beam along the vertical direction depends jointly upon the amplitude of its vibration and the frequency of its vibration, being approximately proportional to $A\omega^2$, where A is the amplitude of the vibration and $\omega$ is $2\pi$ times the frequency of the vibration. So long as this maximum acceleration is less than the acceleration of gravity, the can will remain supported on and in contact with the top of the beam; unless this is provided for, a type of "chattering" or intermittent contact between the can and the beam (or belt) will result, producing a mechanical instability and less reliable mass measurements than are otherwise obtained. Thus the higher the frequency the smaller the maximum amplitude employed for best results. On the other hand, within the limits imposed by the occurrence of "chattering," best accuracy of measurement is obtained by using the largest possible amplitude. Accordingly, gain-controlling means 68 is preferably adjusted just below the point producing "chattering."

Electrical oscillations at the frequency of vibration of the beam are supplied from the output of amplifier 60 to the input of frequency-measuring apparatus 84. The latter apparatus may take any of a variety of known conventional forms suitable for producing at output terminal 86 an electrical voltage indicative of the frequency of vibration of beam 10. In the preferred embodiment the frequency-measuring apparatus is controllable in response to signals supplied thereto from time selection control circuit 87 to provide frequency-indicating signals at output terminal 86 only during predetermined intervals starting and ending at particular times determined by the signals from circuit 87. To provide the timing control required for such operation, control circuit 87 is supplied with a can-position indicating signal over lead 88, from a photocell 90 positioned on one side of belt 30 adjacent beam 10. The latter photocell is mounted so as to be illuminated from a light source 92, disposed on the opposite side of belt 30, so long as no can interrupts the light path between light source and photocell. To this end, light source 92 is supplied with appropriate voltage over line 94 for operating a lamp disposed therein.

Source 92 and photocell 90 are positioned above the beam 10 near the edge thereof at which the moving cans arrive. Accordingly, when the trailing edge of each can has just passed the photocell 90, the photocell will change from an unilluminated to an illuminated condition and the can will be supported entirely upon the beam 10 at that time. This change of the photocell 90 from the unilluminated to the illuminated condition produces a pulse of voltage therefrom on lead 88 which is detected by the time selection control circuit 87 and used to cause the frequency-indicating signal to appear at output terminal 86. For example, time selection control circuit 87 may include an electronic differentiator and clipper for producing a trigger pulse in response to each sudden increase in voltage from photocell 90. In this way the presence of each can on the beam in a definite reference position is caused to initiate output from frequency-measuring apparatus 84.

Output from frequency-measuring apparatus 84 is terminated a predetermined time after it begins. In some forms of known apparatus this time may be set by timing circuits in the frequency-measuring apparatus, and in other cases by a deactuating trigger pulse from the time selection control circuit. For example, in some cases the frequency-measuring apparatus may comprise a conventional frequency-discriminator type arrangement, particularly when the frequencies employed are relatively high and a large number of cycles of oscillations are therefore available for frequency measurement; in this case the time selection of the output of the frequency-measuring apparatus may be accomplished by a simple one-shot multivibrator gate triggered by the pulses from time selection control circuit 87. At lower frequencies and where the number of vibrations per can is limited, the frequency-measuring apparatus may comprise a cycle counter which begins counting at the first occurrence of a particular phase of the oscillations immediately following the pulse from photocell 90, which counts a predetermined fixed number of immediately-subsequent cycles, such as 10 for example, and which produces an output at terminal 86 indicative of the time required for these 10 cycles to occur; in this case the output at terminal 86 directly indicates the period, rather than the frequency, of the oscillations, but since the frequency is the reciprocal of the period the output at 86 then also indicates the frequency, although in an inverse relationship thereto.

The signal at output terminal 86 therefore indicates the masses of the successive cans and contents passing over beam 10 during corresponding successive time intervals. Depending upon the particular use being made of the apparatus and upon the rate of flow of the cans over the beam, the mass-indictaing output at 86 may be visually displayed or may be permanently recorded automatically, and may be in either analog or digital form. However in many cases, especially where the output voltage is to be utilized to produce selection or control functions in response to deviations of the measured mass from a predetermined value for any of a series of rapidly-moving cans, the output voltage at terminal 86 may be automatically compared with a voltage from a reference voltage source 96 by means of a conventional comparator 98, which produces an error output at output lead 99 whenever the voltage at output terminal 86 deviates from the reference voltage by more than a predetermined amount. For example, cans of a standard desired mass may be passed through the apparatus and the reference voltage source 96 adjusted to produce zero error signal at output lead 99 for such standard cans. Any error output signal will therefore indicate a deviation of the mass of a subsequent can and contents from the standard value, and may be used to operate any desired type of control or monitoring equipment; for example it may be used automatically to divert from the train of cans any for which the measured mass deviates by more than a predetermined amount from the desired reference value.

The individual elements of the electronic apparatus described above may in themselves take any of a variety of forms well known in the art, and hence they will not be described herein in detail.

As an example only, and without thereby in any way limiting the scope of the invention, the values of various dimensions and parameters of one form of the embodiment of FIG. 1 may be as follows. The beam 10 may be of spring steel ⅛ inch in thickness, 4⅛ inches wide in the portion having the turned down flange 16 and 4 inches wide for the remainder of the length. The flange 16 may be ½ inch deep and 8 inches long and the cantilever portion of the beam which extends from the support 12 about 10 inches long. The resonant frequency of the beam is typically then of the order of 30 cycles per second when supporting a standard product-filled soup can of cylindrical form about 2⅝ inches in diameter and 4 inches high and having a weight of about 12 ounces. The light and phototube assembly may have its axis spaced about 1/16 inch inwardly from the receiving edge of the beam 10. Driver and sensor cones 40 and 42, respectively, were 2 5/8 inches in diameter at their tops and positioned symmetrically with respect to the corresponding plates 48 and 50, which were each about 3 3/4 inches square. The centers of the two cones were spaced from each other by about 4 1/16 inches, cone 42 having its center spaced about 2 1/4 inches from the free end of beam 10; the spacing between adjacent edges of plates 48 and 50 was about 1/4 inch. With this arrangement, measurements of the masses of about 100 cans per minute may readily be obtained to an accuracy of better than 1%.

Figure 4:
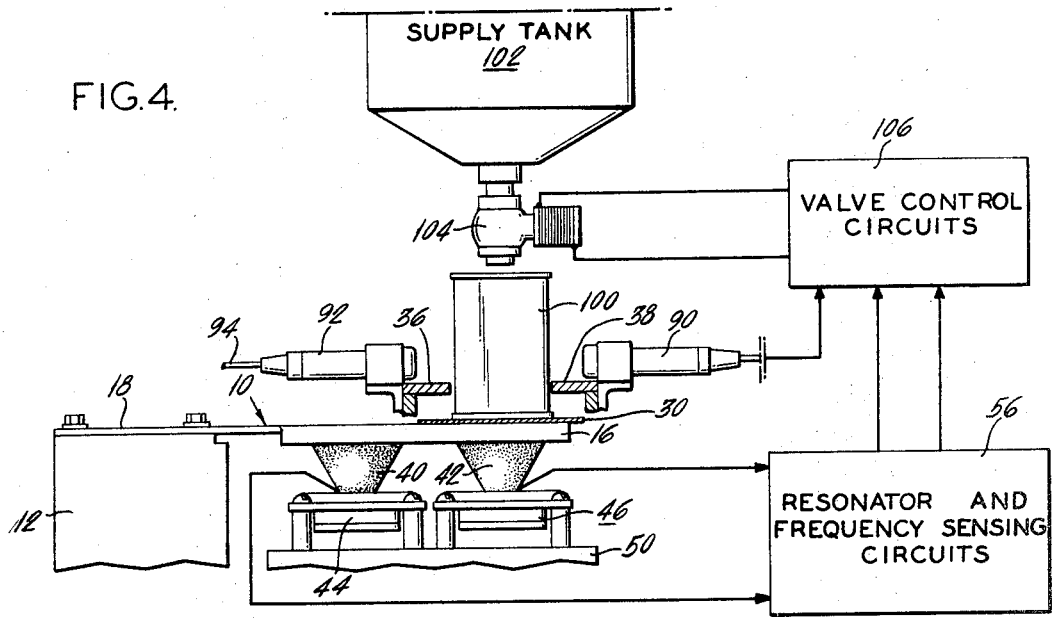
FIG. 4 is a side elevation view of an embodiment of the invention in another application.

FIG. 4, in which parts corresponding to those of FIG. 1 are indicated by corresponding numerals, represents a system using the same mass-sensing arrangement as is shown in FIG. 1, but which is designed to control filling of the same can whose mass is being sensed. In this application the can 100 is initially empty and is to be filled with product from a supply tank 102 by way of a solenoid-controlled outlet valve 104. The can 100 may move continuously at a sufficiently slow rate to be filled during its passage below the outlet valve, or may be moved stepwise into a temporarily-fixed position under the valve for the purpose of filling.

Filling is initiated by the change from the unilluminated to the illuminated state of photocell 90, which change causes a trigger pulse to be supplied to valve control circuits 106 to open valve 104 fully. Signals indicative of the frequency of vibration of the beam 10 supplied to the valve control circuits 106 by resonator and frequency-sensing circuits 56 then cause the valve to close when a predetermined vibration frequency has been reached, corresponding to a predetermined height of product in the can 100. Preferably, the valve control circuits, or the configuration of the valve element itself, cause the valve to remain fully open for most of the filling of the can and then to close gradually during the final filling, so that cutting-off of the flow may be effected rapidly yet accurately. Details of valve control circuits and valve arrangements suitable for these purposes will be readily apparent to those skilled in the art and hence will not be described herein in detail.

Figure 5:
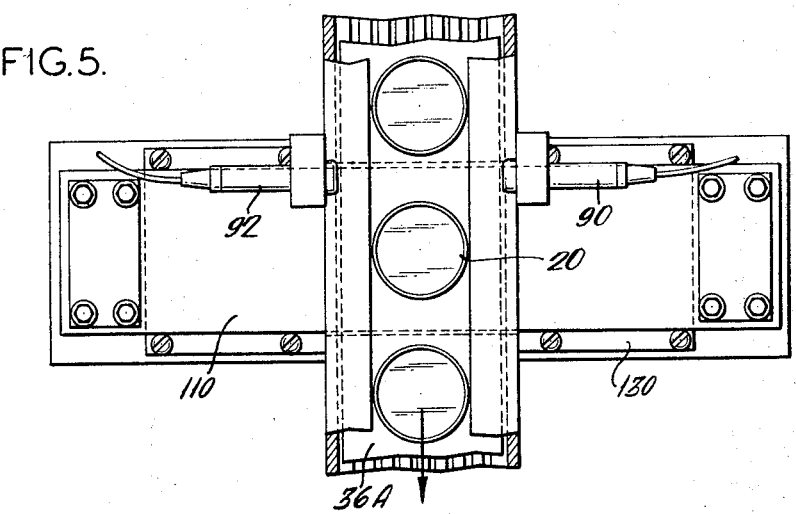
FIG. 5 is a plan view of another embodiment of the invention.
Figure 6:
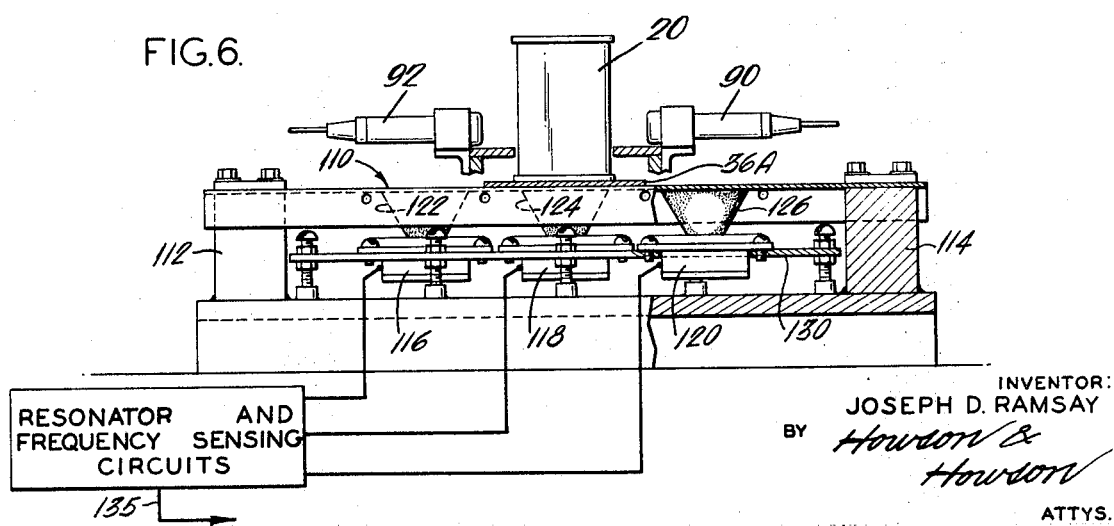
FIG. 6 is a side elevation view, with electrical components illustrated schematically in simplified block form, of the embodiment of FIG. 5.

FIGS. 5, 6 and 7 illustrate an embodiment of the invention in which the vibratory beam 110, instead of being mounted in cantilever fashion, is secured at both ends by means of a corresponding pair of support blocks 112 and 114, to which the ends of the beam are bolted. In addition, the belt 36A, and the train of cans thereon, passes along a line bisecting the free length of the beam 110. Three speaker assemblies 116, 118 and 120 are provided, although only two are used at the same time in most applications. The speaker cones 122, 124 and 126 are cemented directly to the underside of the beam 110, rather than by way of an intervening plate as in the previously-described embodiment. In one example speaker 118 is used as the driver transducer and speaker 120 is the sensor transducer. With this arrangement the beam can be vibrated in a fundamental mode for which the center of the beam is a loop point and the two ends of the beam are node points in the vibratory pattern; however, in other cases the speakers 116 and 120 may both be driven and the speaker 118 used as the sensor. The three speakers are mounted on a common support plate 130. The arrangemnt for transporting the cans, for photoelectrically detecting their position, for vibrating the beam at its resonant frequency and for producing output signals at lead 135 indicative of the resonant frequency may be of the same form as in the embodiment of FIG. 1. The output signal at lead 135 may be used for any of a variety of purposes including those described specifically with reference to FIGS. 1 and 4.

The operation of the system of FIGS. 5, 6 and 7 is also generally similar to that described previously with respect to the other embodiments, except that it has been found easier to obtain a higher vibration frequency with the beam supported at both ends, and in particular frequencies of about ten times those obtained with a similar cantilever beam are readily obtainable.

Again without thereby in any way limiting the scope of the invention, and by way of example only, in the embodiment of FIGS. 5, 6 and 7 the beam 110 may have turned-down flanges extending completely along both of its sides and of a height of about one inch, the total length of the beam being about 20 1/4 inches, its width about 4 1/2 inches, and the length of the beam between the supports being about 15 3/4 inches. The center lines of the two speaker cones 122 and 126 may each be about 3 7/8 inches on each side of the midline of the beam. With the beam empty, vibration frequencies of about 300 cycles per second are obtained, which typically reduce to about 140 c.p.s. when the above-described standard filled can is in place on the center of the beam.

FIG. 8 illustrates a modified form of the invention which differs from that shown in FIGS. 5, 6 and 7 in that the beam is supported and clamped not at the ends but at intermediate points which are nodes in the transverse flexural vibration pattern of the beam. In this arrangment the support blocks at the opposite ends of the beam of FIG. 7 are removed, and instead the beam is supported by a pair of transverse axles 200 and 202 which pass through aligned corresponding pairs of holes in the side flanges of the beam. To support the axles 200 and 202 there are provided corresponding pairs of side support brackets 204 and 206 secured to the base member 208, through which brackets the two axles extend. Internal spacers such as 212 and external spacers such as 216 are provided for the two axles 200 and 202, so that when the nuts 224 on the external ends of the two axles are tightened the beam is rigidly clamped and supported on the axles. The supporting axles 200 and 202 are spaced from the adjacent ends of the beam by substantially .22 of the beam length, e.g., in this example about 4 1/2 inches from the adjacent ends of the beam.

FIG. 9 illustrates another possible form of the invention utilizing a stretched metallic tape 300 in place of the beam, the stretched tape being held and clamped at each of its ends by clamps 302 and 304, to which tensioning force is applied by means of the screws 306, corresponding nuts 308 and two end-support members 310 and 312. In one embodiment the tape was 5 mils in thickness, 4 inches wide and 19 inches long, and vibrated by means of a driving and sensing speaker arrangement as in the embodiment of FIG. 1.

FIG. 10 illustrates a possible modification in which a magnet 500 is mounted on vibratory beam 510 adjacent the position occupied by the can 512 when supported on the beam for mass determination. Magnet 500 may be a permanent magnet bolted or cemented to the upper face of the beam, or may be an electromagnet similarly positioned. Assuming the can contains magnetic material, the magnet will hold the can in fixed position on the beam during measurement of mass, permitting higher amplitudes of vibration without "chattering" or mechanical instability. In this case positive intermittent transport of the cans is preferred to assure release from the magnet when measurement is complete; or, when an electromagnet is used, timed pulses of current to the electromagnet may be used to produce effective magnetic clamping of the can to the beam only when a measurement is to be made. Magnets also may be used to permit use of the beam on its side, upside-down or even vertically, the magnet serving to clamp the can to the beam so long as required for the measurement. A solenoid 514 may be used to operate a plunger 516 for pushing the cans away from the magnet when measurement is complete, so the can will be free for transport.

In general, there may be more than one possible mode of flexural vibrations for the beam which may be used for mass measurements, the particular mode produced being determined by well-known factors such as the location of the points at which the beam is clamped, as described in connection with FIG. 8.

FIG. 11 illustrates graphically, although not necessarily to scale, the amplitude-limiting action provided by the negative feedback circuitry of FIG. 1; in FIG. 11 ordinates represent amplitudes of signals to amplifier 60 and abscissae represent amplitudes of signals produced by the speaker-type vibration sensor 42 of FIG. 1. The curves + and − represent the signals at the + and − input terminals respectively of amplifier 60. The amplitude A of the signal to the + terminal is proportional to the signal from the vibration sensor and therefore is represented by a rising straight line. The signal to the − terminal is substantially proportional to the square ($A^2$) of the instantaneous maximum amplitude of the signal to the + terminal, and hence increases more slowly than the + terminal signal at low amplitudes but more rapidly than the + terminal signal at higher levels so that the two solid-line curves intersect at point $P_1$. The amplitude will therefore build up initially at a rapid rate because of the initial large difference between the + and − terminal signals, but will be limited to an amplitude slightly less than that corresponding to the abscissa of point $P_1$ in FIG. 11. The broken-line curve in FIG. 11 illustrates how the amplitude will be limited at a lower level corresponding to point $P_2$ when the gain of device 68 is reduced.

While the invention has been described with particular reference to specific embodiments thereof in the interest of complete definiteness, it will be understood that it may be embodied in a variety of other forms without departing from the scope of the invention.

What is claimed is:
1. Apparatus for sensing the mass of an object, comprising:
  an elongated member capable of transverse vibration and having a resonant frequency of flexural vibration which depends upon the mass of an object supported thereby;
  means for vibrating said member and an object supported thereby at said resonant frequency; and
  means for detecting said resonant frequency of said member with said object supported thereby;
  said means for vibrating said member comprising means responsive to said vibrations to produce electrical signals synchronous with said vibrations, means for amplifying said signals, and means responsive to said amplified signals to apply synchronous vibratory forces to said member;
  said amplifying means comprising means for limiting the amplitude of said synchronous vibratory forces;
  said limiting means comprising a positive-feedback circuit for applying said electrical signals in a phase to increase the amplitude of said vibratory forces and a negative-feedback circuit for applying said electrical signals in a phase to reduce the amplitude of said vibratory forces, said negative-feedback circuit having a gain which is lower for lower amplitude signals supplied thereto than for higher-amplitude signals supplied thereto.

2. Apparatus in accordance with claim 1, in which said negative-feedback circuit comprises a rectifier and filter supplied with said electrical signals for producing a direct control voltage varying in the same sense as the amplitude of said electrical signals, a signal multiplier having a gain dependent upon the value of a control voltage applied thereto, means for supplying said electrical signals to said multiplier to be amplified therein, and means for supplying said direct control voltage to said multiplier to vary the gain thereof.

3. Apparatus for determining the weight of an object, comprising:
  a member having a resonant frequency of flexural vibration which depends upon the weight of an object supported thereon;
  drive means responsive to in-phase electrical signals supplied thereto for applying to said member a vibratory force synchronous with said signals to increase the amplitude of said vibrations;
  means for producing electrical signals out of phase with said in-phase signals;
  means for limiting the amplitude of vibration of said member so that the magnitude of said vibratory force is less than a predetermined maximum value, said limiting means comprising means for combining said out-of-phase signals with said in-phase signals; and
  means for measuring said resonant frequency of said member with said object supported thereon, thereby to determine the weight of said object.

4. Apparatus in accordance with claim 3, wherein said means for producing in-phase signals and said means for producing out-of-phase signals comprise transducer means responsive to said vibrations for producing a primary signal and means for deriving said in-phase signals and said out-of-phase signals from said primary signal.

5. Apparatus in accordance with claim 4, wherein said combining means comprises variable-gain means supplied with said out-of-phase signals prior to their combination with said in-phase signals for increasing the amplification of said out-of-phase signals in response to increases in amplitude of said in-phase signals, whereby the amplitude of said out-of-phase signals in relation to that of said in-phase signals is substantially greater for greater amplitudes of said primary signal than for lesser amplitudes thereof.

6. Apparatus in accordance with claim 5, comprising means responsive to said primary signal for developing a control signal increasing with the amplitude of said primary signal and for applying said control signal to said variable-gain means to increase the amplification provided thereby when said amplitude of said primary signal increases.

7. Apparatus for sensing the mass of an object comprising:
  a member having a resonant frequency of flexural vibration which depends upon the mass of an object supported thereby;
  means for increasing the amplitude of vibration of said member, including means responsive to vibrations of said member to produce a primary electrical signal synchronous with said vibrations, means for amplifying said primary signal, and means responsive to said amplified signal to supply synchronous vibratory forces to said member;
  means for limiting said amplified signals so that the magnitude of the vibratory force is less than that which would cause the object to lose contact with said member, said limiting means comprising a feedback circuit including a rectifier and filter supplied with said primary signal for producing a direct control voltage varying with increases in amplitude of said primary signal, a signal multiplier supplied with said primary signal and with said control signal to produce an output signal increasing in amplitude with increases in amplitude of said primary signal but at a rate greater than the rate of increase in amplitude of said primary signal, and means for combining said output signal with said primary signal in opposite phase thereto, said signal multiplier having a characteristic such that for relatively small values of said control signal said multiplier output signal is smaller than said primary signal with which it is combined, but for larger values of said control signal is effective to cause limiting of the amplitude of said primary signal at a predetermined level; and
  means for measuring said resonant frequency of said member and object, thereby to determine the weight of the object by comparison with frequency-weight calibrations of said apparatus.

8. Apparatus for sensing the mass of an object, comprising:
- an elongated member having a resonant frequency of flexural vibration which depends upon the mass of an object supported thereby;
- electromechanical driving means for maintaining vibration of the member at its resonant frequency with said object thereon;
- electromechanical means responsive to vibrations of said member to produce a primary electrical signal synchronous with said vibrations;
- a positive feedback circuit for amplifying the primary signal and for applying the amplified primary signal to said electromechanical driving means in a phase to increase the amplitude of said vibrations;
- a negative feedback circuit for limiting said member to a selected maximum amplitude of vibration at said resonant frequency, including a rectifier and filter supplied with said primary electrical signal for producing a direct control voltage increasing with increases in the amplitude of said primary signal, a signal inverter and a multiplier responsive to said primary signal for producing an output signal having a phase opposite to said primary signal and increasing in amplitude at a rate greater than corresponding increases in amplitude of said primary signal and means for combining said output signal with said primary signal; and
- means for measuring said resonant frequency of said member and object, thereby to determine the weight of said object.

9. A method for determining the weight of objects, comprising:
- moving each of the objects to be weighed into a position in which it is supported by a member capable of resonant vibration in flexure;
- applying a synchronous vibratory force to said member to increase the amplitude of its vibration, the magnitude of said force being dependent upon the amplitude of an in-phase electrical signal;
- limiting the amplitude of vibration of said member by combining an out-of-phase electrical signal with said in-phase electrical signal in such manner that the magnitude of the vibratory force is only sufficient to maintain the member and object at a preselected maximum amplitude of vibration; and
- measuring the resonant frequency of said member and object.

10. The method as defined in claim 9, further including:
- producing said in-phase signal and said out-of-phase signal by sensing said flexural vibrations to produce a primary signal and by providing different phase changes in said primary signal to generate said in-phase and out-of-phase signals.

11. The method as defined in claim 10, further including:
- multiplying said out-of-phase signal by a factor which increases with increases in the amplitude of said primary signal, before said out-of-phase signal is combined with said in-phase signal, so that the amplitude of said out-of-phase signal in relation to that of said in-phase signal is much greater at a higher amplitude of said primary signal than at a lower amplitude thereof.

References Cited

UNITED STATES PATENTS

| | | | |
|---|---|---|---|
| 2,305,783 | 12/1942 | Heymann et al. | 73—67 |
| 2,694,310 | 11/1954 | Pounds | 73—67 |
| 2,744,408 | 5/1956 | Seney | 73—67.2 |
| 3,273,380 | 9/1966 | Seney | 73—67.2 |
| 3,354,698 | 11/1967 | Christmann | 73—67.2 |
| 3,366,191 | 1/1968 | Reid et al. | 177—210 |

FOREIGN PATENTS

| | | |
|---|---|---|
| 488,921 | 7/1938 | Great Britain. |
| 916,110 | 1/1963 | Great Britain. |
| 1,034,475 | 6/1966 | Great Britain. |

RICHARD B. WILKINSON, Primary Examiner

G. H. MILLER, JR., Assistant Examiner

U.S. Cl. X.R.
73—67.2; 177—210